United States Patent [19]

Bourrez

[11] Patent Number: 4,590,555
[45] Date of Patent: May 20, 1986

[54] APPARATUS FOR SYNCHRONIZING AND ALLOCATING PROCESSES AMONG SEVERAL PROCESSORS OF A DATA PROCESSING SYSTEM

[75] Inventor: Jean-Marie Bourrez, Versailles, France

[73] Assignee: Compagnie Internationale pour l'Informatique Cii-Honeywell Bull (Societe Anonyme), Paris, France

[21] Appl. No.: 215,522

[22] Filed: Dec. 11, 1980

[30] Foreign Application Priority Data

Dec. 11, 1979 [FR] France ............................... 79 30332

[51] Int. Cl.⁴ .................... G06F 15/16; G06F 15/46
[52] U.S. Cl. .................................................. 364/200
[58] Field of Search ... 364/200 MS File, 900 MS File, 364/131, 133

[56] References Cited

U.S. PATENT DOCUMENTS

| | | | |
|---|---|---|---|
| 3,363,234 | 1/1968 | Erickson et al. | 364/200 |
| 3,496,551 | 2/1970 | Driscoll et al. | 364/200 |
| 3,566,357 | 2/1971 | Ling | 364/200 |
| 4,123,794 | 10/1978 | Matsumoto | 364/200 |
| 4,123,795 | 10/1978 | Dean, Jr. et al. | 364/200 |
| 4,214,305 | 7/1980 | Tokita et al. | 364/200 |
| 4,297,743 | 10/1981 | Appele et al. | |
| 4,369,494 | 1/1983 | Bienvenu et al. | |
| 4,374,409 | 2/1983 | Bienvenu et al. | |

Primary Examiner—Thomas M. Heckler
Attorney, Agent, or Firm—Lowe, King, Price & Becker

[57] ABSTRACT

Applicant processes to be performed on several processors in a data processing system are synchronized and allocated. The data processing system includes plural processors, each of which derives a control signal indicating that an event has occurred which requires a change in the status of the system, as well as registers for storing signals indicative of a process being executed by the processor. A memory common to the processors is selectively coupled to the processors via a bus. A circuit connected to the memory, the bus and selectively coupled to the processors selectively couples signals between a selected processor and the memory via the bus. The applicant processes are allocated and synchronized by a first circuit responsive to the control signal that allocates one of the processors to an applicant process and by second circuit that couples signals for the process being executed by the allocated processor at the time the control signal is coupled to the allocated process from the registers of the allocated processor to the memory via the data bus which thereafter couples signals for the applicant process from the memory to the registers of the allocated processors via the bus.

11 Claims, 13 Drawing Figures

| PRIORITY | STATUS | PMW |

| DCN | STWA (ASW) |
| T (SKW) | SKW |
| IC (ICW) |
| PRHM | PRSM |
| SAFEGUARDE ZONE FOR REGISTERS |

FIG.2

|   | CPST |   |   |
|---|------|---|---|
| 0 | 1  3 | 4      15 | 16      31 |

FIG.4

| NL | R | D | S/U | RHU | PRI |   |
|----|---|---|-----|-----|-----|---|
| 0            15 | 16 | 17 | 18 | 24 | 27 28 | 31 |
| JP | CPMK |
| 32            47 | 48            63 |

FIG.6 under the control of a supervisor. Upon termination of a process, another process of the total number of processes in the supervisor replaces the terminated process.

APPARATUS FOR SYNCHRONIZING AND ALLOCATING PROCESSES AMONG SEVERAL PROCESSORS OF A DATA PROCESSING SYSTEM

TECHNICAL FIELD

The present invention relates generally to systems for synchronizing and allocating processes between several processors of a data processing system and, more particularly, to a data processing system including several individual processors and a central memory to which each processor is selectively connected by a transmission bus, wherein the connection between each processor and the memory is made without going through another processor and means is associated with the bus for selectively connecting a processing unit to the memory.

BACKGROUND ART

As defined in the specification and claims of the present disclosure a process is a program composed of an ordered set of instructions and a set of data associated with the instructions that can be executed by a data processing system to perform a job ordered or requested by a user. A process can be carried out by a processor, which is a hardware device of a data processing system. The processor is capable of controlling the execution of instructions associated directly with the process and in processing data associated with several processes.

When a large number of processes simultaneously seek access to the same processor, managing the execution priorities of the processes, as well as communication of the processes to the processor, is extremely complex. However, data processing systems have been developed in which these problems have been solved. One solution to these problems is described in "French Patent Nos. 2,253,419 and 2,253,417, respectively entitled "Process Management System For A Data Processor" and "Process Synchronization Using Semaphores", in the name of the assignee of the present invention. However, the development of large scale integration (LSI) calculating units favors the development of data processing systems utilizing several processors or microprocessors in a single data processing system. A problem which arises in connection with the use of several microprocessing systems is allocating the processes to the processors of the system. Allocating the processes to the several processors is a time consuming operation of varying complexity, according to the choice of algorithms which are employed in the processes. The more complicated the algorithms, the greater risk there is of disturbing tables including parameters necessary for operatinq the data processing system.

It is, therefore, an object of the present invention to provide a new and improved device for allocating processes to several processors.

Another object of the invention is to provide a new and improved device for allocating processes to processors with a very high performance factor, with an average degree of complexity.

Another object of the invention is to provide a device for enabling several processes to be executed by several LSI processors that share a common central memory.

DISCLOSURE OF THE INVENTION

According to the present invention, several processes are allocated to several processors by a dispatcher. The dispatcher allocates the processes to the processors in two phases referred to as a select phase and an execute phase. The select phase involves assigning the actual processors to the prospective processes. The execute phase involves emptying the contents of a current process being executed by a particular processor and replacing it with a new process in the selected processor.

According to another feature of the invention, a call of the dispatcher is released when a change occurs in the status of the processes which await execution or in the status of the processors which are executing a process. The call by the dispatcher occurs in response to the processor in which a change has occurred.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIG. 2 is a schematic diagram of the format of a process control block in the main memory of the system of FIG. 1;

FIG. 4 is a schematic diagram of the format of a processor table element stored in the central memory in the system of FIG. 1;

FIG. 6 is a schematic diagram of the format of a process link that enables the processes which are ready for execution in the central i.e. main memory unit to be to be connected to the processors;

BEST MODE FOR CARRYING OUT THE INVENTION

Figure 1:
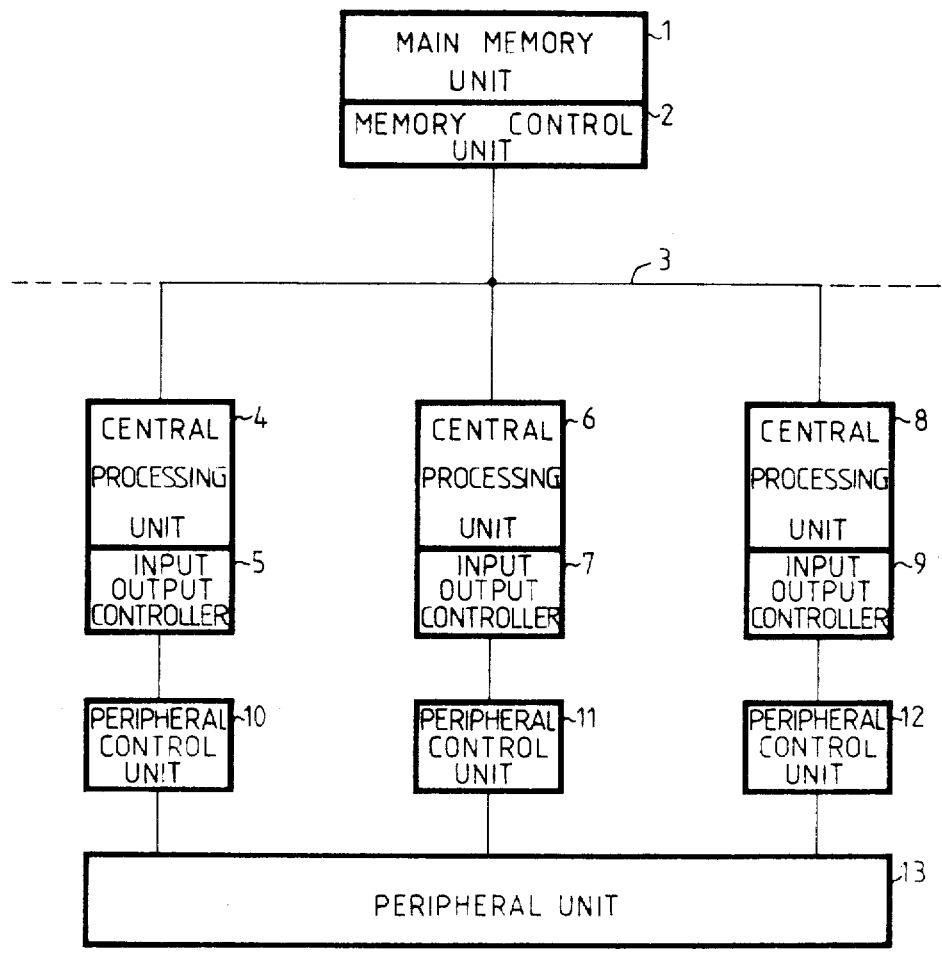
FIG. 1 is a block diagram of one embodiment of a data processing system utilizing the present invention.

The data processing system illustrated in FIG. 1 includes a main read/write memory unit MMU 1 controlled by a memory control unit MCU 2. Memory control unit 2 is connected to a plurality of central processing units or processors, preferably microprocessors, specifically illustrated in the Figure as CPU 4, CPU 6 and CPU 8. Processors 4, 6 and 8 are connected to memory control unit 2 by way of bus 3 which includes a data segment, an address segment and a control segment.

Each of processors 4, 6 and 8 is respectively connected to peripheral control units PUC 10, PUC 11 and PUC 12 through conventional input-output controllers IOC 5, IOC 7 and IOC 9. Peripheral control units 5, 7 and 9 are connected to multiple peripheral units PU 13 which are included in the system. At any particular time, main memory unit 1 contains several processes which are capable of being carried out by processors 4, 6 and 8.

As previously stated, a process is defined as data and an ordered set of instructions which can be carried out in an asynchronous manner by each processor. A process can be executed in a particular processor at any time. However, a process can also give up control of the processor where the process is being executed and pass control of the processor to another process. For example, central processing unit 4 can be executing a program associated with a particular process but a higher priority process can sieze processing unit 4 and cause central processing unit 4 to execute the program associated with the higher priority process on the data associated with the higher priority process. To enable the process which has been siezed, i.e. interrupted to be resumed at the same point, the status of the siezed or interrupted process must be preserved in an appropriate zone of main memory unit 1. The status of the previously preserved process conditions a processor before the seized or interrupted process retakes control of the processor which was performing the process.

The zone in main memory unit 1 associated with a particular process is referred to herein as a process control block (PCB); a schematic diagram of the memory zone attributed to a particular process is illustrated in FIG. 2 from which it is seen that the process control block is divided into several regions, referred to as a priority region, a status region, a decor (DCN) region, region STWA (ASW), region T (SKW), region IC (ICW), region PRHM, region PRSM, and a register safeguard region. The priority region defines the priority level which a particular process has associated with it such that the highest priority level has the lowest number associated with it. The status region indicates what the state of the process is; in particular that the process began operation in a particular processor or processors but that the process has been transferred from the processor or processors to main memory unit 1, that execution of the process has never been initiated, that the process is in a waiting queue with other processes that are ready to be executed, that the process is in a waiting queue on a semaphore, or that the process is actually being executed by a processor or processors. A decor zone is employed because each processor that might execute the process has a unique functional architecture and because certain processes can only be carried out with a particular architecture. It is necessary for the decor stored in region DCN to match the decor or architecture of the data processing system. Hence, if the decor stored in region DCN does not exist in the processor selected or available to execute the process, the process control block illustrated in FIG. 2 cannot be performed by the processor and is considered as not being valid.

Region STWA (ASW) identifies the start address of a segment address table in main memory unit 1 for the process. Region STWA (ASW) enables the address of an assigned segment describer to be obtained so that the processor can proceed to that address to obtain program and data information. Region T (SKW) contains the value in a pointer register T at the top of a pile situated in a pile segment of main memory unit 1. The word contained in region T (SKW) contains the number in the register at the top of the pile segment when the process is not being executed. The word contained in region T (SKW) is updated every time the process leaves the execution state and is used to update the contents of pointer register T of a processor 4, 6 or 8 each time that a process is coupled for execution to one of processors 4, 6 or 8. Region IC (ICW) contains the value of the number in an instruction counter of processor 4, 6 or 8 at the time when execution of the process was terminated in processor 4, 6 or 8, in favor of execution of a higher priority process. Region IC (ICW) is updated each time the process leaves the execution state of processor 4, 6 or 8. Region IC (ICW) is used each time the process returns to the execution state to update the instruction counter of processor 4, 6 or 8 in which the process is to be executed.

Regions PRHM and PRSM are one bit masks having a state corresponding with the central processing units 4, 6 and 8 of the system whereby, in the system of FIG. 1, three such one bit masks are provided. A zero bit value in mask PRHM or PRSM indicates that the processor associated with the particular bit position can perform the process, while a bit value of one means that the processor cannot execute the process. The process control block can include other zones for storing the contents of registers of processors 4, 6 or 8 when a process in one of the processors is interrupted by a higher priority process. For example, if a processor includes an arithmetic logic unit having a register or a scratch pad memory, or input-output registers, the value stored in these units at the time that a process being executed in the processor is interrupted are transferred to the register safeguard region of the process control block. The register safeguard region of the process control block can contain other data, such as described in the previously mentioned patents.

Figure 3A:
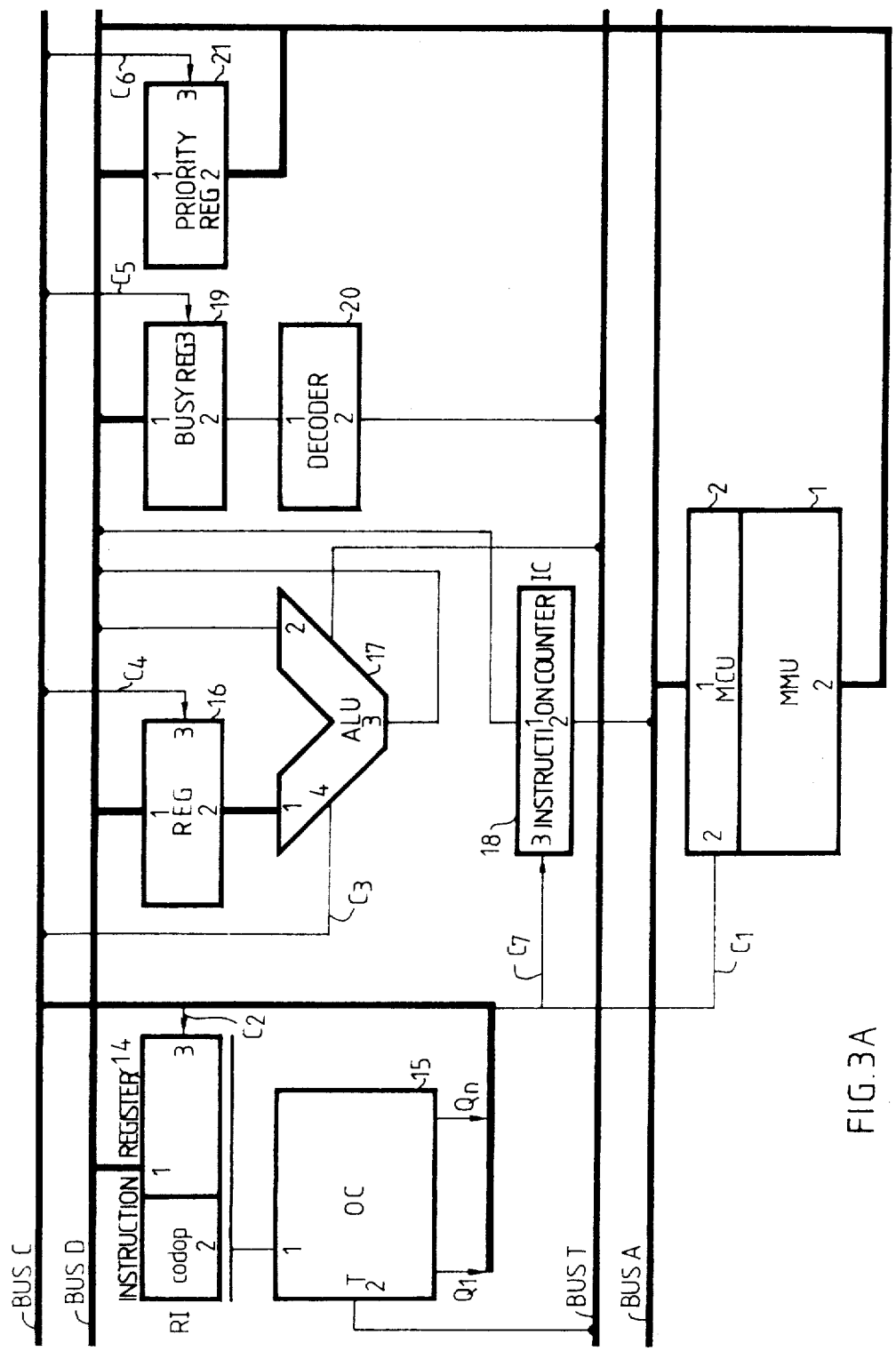
FIGS. 3a and 3b are circuit diagrams of the apparatus included in each processor of the system of FIG. 1, to enable the processor to allocate processes to different processors.
Figure 3B:
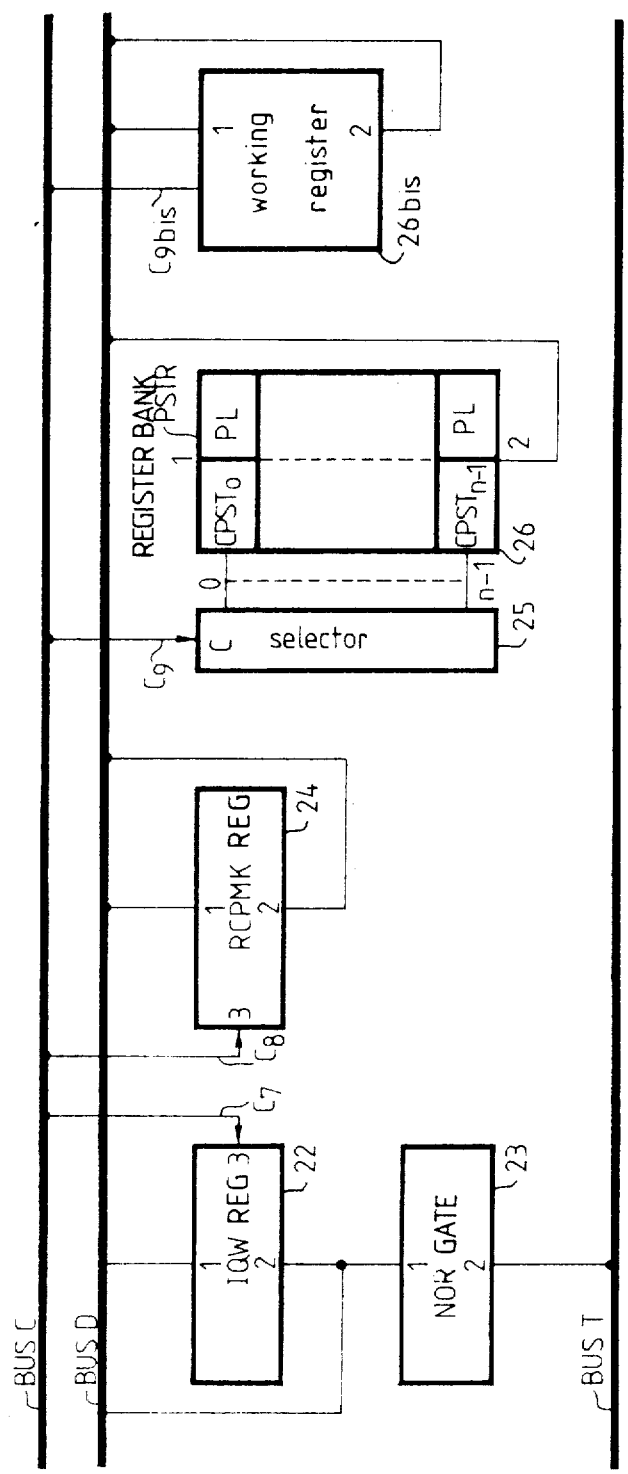
Figure 3C:
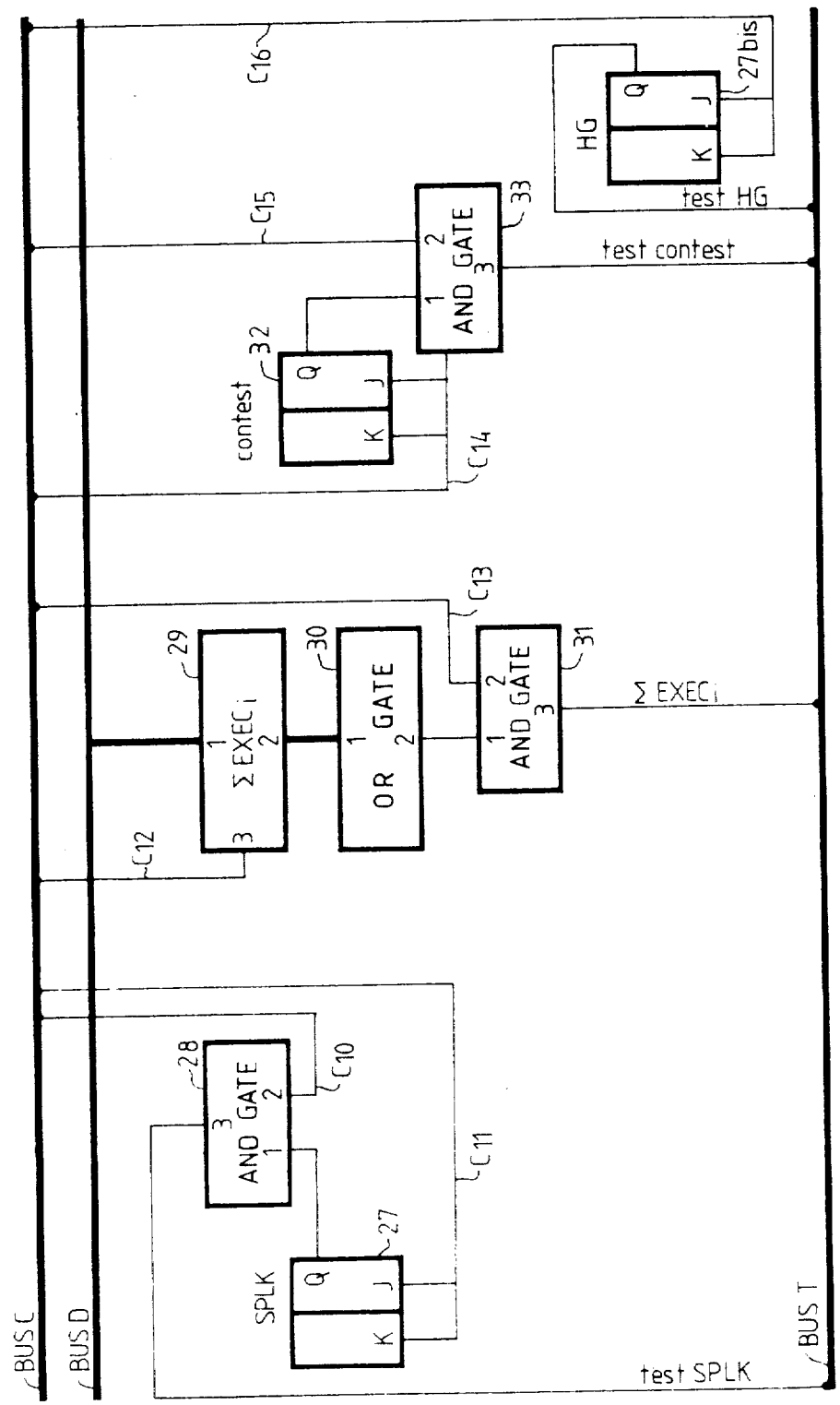
FIG. 3c is a circuit diagram of hardware utilized in the memory control unit of the system of FIG. 1 to allocate the processes to the various processors.

Reference is now made to FIGS. 3a, 3b and 3c wherein there are illustrated circuit diagrams of the hardware elements included in each of processors 4, 6 and 8 to enable the processors to allocate the processes to the various processors and in memory control unit 2. FIG. 3a is a circuit diagram of the elements constituting the normal structure of a central processing unit or microprocessor 4, 6 or 8. For further details on the structure included in a conventional microprocessor, reference should be made to the book "Microprogramming Principles and Practices", Samir S. Husson, edited by Prentice Hall, copyright 1970.

The apparatus illustrated in FIG. 3 includes main memory unit 1, memory control unit 2, which controls main memory unit 1, control member OC 15, instruction register RI 14, arithmetic logic unit ALU 17, accumulator register ACC 16, busy register 19, decoder 20, priority register 21, and instruction counter IC 18. These elements are connected together by address bus A, control bus C, data bus D, and test bus T which are connected to and are a part of bus 3, FIG. 1. Address bus A connects input 1 of memory control unit 2 to output 2 of instruction counter IC that contains the address of an instruction which is being executed by the processor. Data and instructions read from memory 1 or written into memory 1 are transferred to the processor via data bus D that is connected to multi-bit terminal 2 of memory unit 1 and to multi-bit input terminal 1 of instruction register 14, to multi-bit input 1 of accumulator 16, to multi-bit input 1 of busy register 19, to multibit input 1 and to multi-bit output 2 of priority register 21 and to multi-bit input 2 of arithmetic logic unit 17. Multi-bit output 2 of instruction register 14 is connected to multi-bit input 1 of control member 15, a microprogrammed structure of the type described on pages 491–500 of the previously mentioned book by Husson.

Control member 15 includes a multi-bit output $Q_1 \ldots Q_n$ on which are derived signals $C_1 \ldots C_n$ that control selective activation of the various elements of the processor. Control member 15 stores a microprogram to perfrom the operations associated with the flow diagrams of FIGS. 7a, 7b, 8a, 8b and 8c. Control member 15 includes a multi-bit input 2 responsive to bits in test bus T and thus is responsive to test results derived by the processor of which it is a part, as well as other processors carrying out the process. Control member 15 therefore functions to perform instructions and execute branching on starting addresses of microprograms written therein. Execution of the microprogram is performed by the apparatus of the processor in response to the derivation of binary signals on output terminals $Q_1 \ldots Q_n$ of control member 15.

Accumulator register 16 includes a multi-bit output connected to a multi-bit input of arithmetic logic unit 17. Arithmetic logic unit 17 performs arithmetic and logic operations on two multi-bit operands respectively applied to inputs 1 and 2 thereof. The operand applied to input terminal 1 of arithmetic logic unit 17 is derived from multi-bit output 2 of accumulator register 16, having a multi-bit input 1 responsive to data on multi-bit data bus D. Input 2 of arithmetic logic unit 17 is a multi-bit input directly responsive to data signals on data bus D.

Arithmetic logic unit 17 responds to the multi-bit inputs applied to inputs 1 and 2 thereof to derive a multi-bit signal applied to output 3 of the arithmetic logic unit. The multi-bit signal applied to output 3 of unit 17 is coupled back to data bus D and thence to input 1 of accumulator 16 or to another register of the processor which is enabled simultaneously with arithmetic logic 17 by an output of control member 15.

Multi-bit output 2 of busy register 19 is coupled to multi-bit input 1 of decoder 20, having a one bit output 2 that is connected directly to test bus T. Decoder 20 responds to a predetermined combination of bits applied to input terminal 1 thereof to derive a binary one signal to indicate to control member 15 that busy register 19 contains a predetermined combination of binary ones and zeros. Control member 15 responds to the signal applied to it by decoder 20 to generate a predetermined sequence of signals on output terminals $Q_1 \ldots Q_n$ thereof.

Each of the elements illustrated in FIG. 3a, except main memory unit 1, control member 15 and decoder 20, is provided with a control input terminal which, when supplied with a binary one signal, enables the element to be in an active state. When a binary zero level is applied to the control input of each of these elements, the element is inactive and is unresponsive to inputs thereof and does not derive an output signal. The control inputs for these elements are derived by control member 15, such that the control member generates output signals $C_1$-$C_7$ which are respectively applied to leads $Q_1$-$Q_7$ thereof. In particular, memory control unit 2 includes input 2 responsive to an enable signal $C_1$, instruction register 14 includes an input terminal 3 responsive to control signal $C_2$, arithmetic logic unit 17 includes an enable input terminal 4 responsive to signal $C_3$, accumulator register 16 includes an input terminal 3 responsive to control signal $C_4$, busy register 19 includes an enable input 3 responsive to control signal $C_5$, priority register 21 includes an enable input 3 responsive to control signal $C_6$, and instruction counter 18 includes an enable input 3 responsive to control signal $C_7$.

Reference is now made to FIG. 3b of the drawing wherein there is illustrated circuitry included in each of central processing units 4, 6 and 8 to assist in enabling the present invention to be performed. The circuits illustrated in FIG. 3b are organized around control bus C, data bus D and test bus T. Data bus D interconnects multi-bit input 1 of register IQW 22, multi-bit input 1 of register RCPMK 24, and multi-bit input 1 of register bank PSTR, as well as outputs 2 of registers 22, 24 and 26. Control signal $C_7$, as derived on output lead $Q_7$ of control member 15, is applied as an enable input to terminal 3 of register 22, while control signal $C_8$ is applied as an enable signal to terminal 3 of register 24 from output lead $Q_8$ of control member 15. Thus, counter 18 and register 22 are simultaneously enabled in response to the parallel outputs on control lead $Q_7$ of control member 15. Selector 25, which enables one of the several registers in register bank 26, is responsive to a serial signal $C_9$ applied by control member 15 to output terminal $Q_9$ thereof. Selector 25 enables one or all of the registers in bank 26 to be selected so that it can be responsive to a multi-bit signal on bus D or it can supply a multi-bit signal to bus D.

The multi-bit output 2 of register IQW is combined in NOR gate 23, having a single bit output 2 which is applied to test bus T. Thereby, in response to any bit of the multi-bit output 2 of register 22 having a binary one value, NOR gate 23 applies a binary zero value to one of the leads in test bus T. If all of the bits in output 2 of register 22 have a binary zero value, NOR gate 23 applies a binary one signal to the lead of test bus T.

The FIG. 3b circuitry further includes a group of working registers 26 bis having a multi-bit input 1 and a multi-bit output 2, both of which are connected to data bus D. In addition, working registers 26 bis are selectively enabled in response to a control signal $C_{9bis}$ derived by control member 15 on output lead $Q_{9bis}$ thereof.

Reference is now made to FIG. 3c of the drawing wherein there is illustrated circuitry included within memory control unit 2 which is responsive to signals from processors 4, 6 and 8 on control bus C, data bus D and which derives signals that are applied to test bus T. The apparatus of FIG. 3c includes flip-flop SPLK 27 which locks the system to protect various signals in the process being executed and which is interrupted by a higher priority process, counter $\Sigma$ EXEC$_i$ 29, and contest flip-flop 32. Flip-flop 32 is activated by a processor desiring to make a modification in the process. Flip-flop 32 authorizes the processor making the modification to execute a select function in accordance with the flow diagrams of FIGS. 7a and 7b. The circuit diagram of FIG. 3c also includes flip-flop HG 27 bis which functions in connection with flip-flop 27. Each of flipflops 27, 27 bis and 32 is of the J-K type and includes a set (Q) output on which are respectively derived one and zero level signals in response to the flip-flop being activated into the set and reset states. Typically, flip-flops 27, 27 bis and 32 include clock input terminals, although such terminals are not illustrated in FIG. 3c for the sake of clarity.

The J and K input terminals of flip-flop 27 are responsive to a pair of control signals $C_{11}$ derived by control member 15 on output leads $Q_{11J}$ and $Q_{11K}$. The set output Q of flip-flop 27 is DC coupled to input terminal 1 of AND gate 28, having input terminal 2 responsive to control signal $C_{10}$, as derived from output lead $Q_{10}$ of control member 15. In response to signal $C_{10}$ having a binary one value, AND gate 28 is responsive to the state of flip-flop 27, whereby a binary signal is derived by the AND gate on output terminal 3 thereof indicative of the state of flip-flop 27.

Counter 29 includes a multi-bit input 1 directly connected to bus D, which supplies a signal to the input of the counter indicative of an initial value to be loaded into the counter when it is activated to an enable state by a binary one value of signal $C_{12}$, as applied to input terminal 3 of the counter via one bit of three bit output lead $Q_{12}$ of control member 15. Counter 29 also includes increment and decrement inputs respectively responsive to binary one values of signals $C_{12i}$ and $C_{12d}$ derived on second and third bits of lead $Q_{12}$ of control member 15 in a manner described infra in connection with FIGS. 7a and 7b. Counter 29 includes a multi-bit output 2 that is supplied to input terminals 1 of OR gate 30, having a binary one value. The binary signal at output 2 of OR gate 30 is coupled to input terminal 1 of AND gate 31, having input terminal 2 which is enabled by signal $C_{13}$ by way of output $Q_{13}$ of control member 15. Thereby, in response to counter 29 being loaded with a count signal having a value other than zero while signal $C_{12}$ has a binary one value, a binary one value is derived from AND gate 31 is response to the subsequent derivation of a binary one value for signal $C_{13}$. The binary one value derived from terminal 3 of AND gate 31 is applied to test bus T to control activation of control member 15. The zero status of counter 29 indicates that all operations assigning processes to a particular processor have been terminated. Counter 29 is incremented and decremented by signals $C_{12i}$ and $C_{12d}$ each time the processor is allocated to a process and each time that an allocation for the processor is terminated, respectively.

J and K input terminals of contest flip-flop 32 are respectively responsive to signal $C_{14J}$ and $C_{14K}$, respectively derived by control member 15 on output leads $Q_{14J}$ and $Q_{14K}$. The set (Q) output of flip-flop 32 is directly coupled to input terminal 1 of AND gate 33, having input terminal 2 that is responsive to signal $C_{15}$, as derived from output terminal $Q_{15}$ of control member 15. Thereby, in response to signal $C_{15}$ having a binary one value, AND gate 33 couples the state of flip-flop 32 to test bus T.

The J and K input terminals of flip-flop 27 bis are respectively responsive to signals $C_{16J}$ and $C_{16K}$, as derived on output leads $Q_{16J}$ and $Q_{16K}$ of control member 15. In response to flip-flop 27 bis being in a set state in response to the signals applied to the J and K inputs thereof, a binary one signal is derived from output terminal Q thereof and applied directly to test bus T. Flip-flops 27 and 27 bis are system locks to protect the semaphores, process waiting queues, waiting on semaphores, waiting queues for processes awaiting execution to enable updating of the status of the various processors of the system or of processes of the system that are awaiting execution by the system.

Contest flip-flop 32 is activated to the set state such that a binary one signal is derived from the Q output thereof in response to control member 15 supplying input terminal J of the flip-flop with a binary one signal. A binary one signal is applied to input terminal J of flipflop 32 when the system is going to perform any operation which causes a change in a waiting queue of processes awaiting execution. This change can be caused by adding another process to a waiting queue, withdrawing a process from the waiting queue, or modifying an order of the waiting processes.

The allocation of the different processes to processors 4, 6 and 8 is performed with the aid of table CPSTT, FIG. 4, located in main memory unit 1 wherein the current status of the system processors is stored. The status of each of processors 4, 6 and 8 is stored in table CPSTT of main memory unit 1 with the aid of a status word having a format also shown in FIG. 4.

Table CPSTT, FIG. 4, is a 32 bit table having a three bit field CPST, including bits 1, 2 and 3, as well as a 16 bit address field or segment GO that extends from bits 16–31, inclusive. The nature and function of segment GO are described in the previously mentioned patents; the role of segment GO is described infra. It is to be understood that one of tables CPSTT is provided in main memory unit 1 for each of the processors in the system. In response to the bits of field CPST of table CPSTT for a particular processor having the values 000, the process 4, 6 or 8 associated with the field is indicated as not existing in the system configuration. In response to the bits of field CPST having binary values of 001, an indication is provided that the processor associated with table CPSTT is not available to a process. A value of field CPST equal to 010 indicates that the processor with which a particular table CPSTT is associated is vacant. Thereby, the processor associated with table CPSTT can execute a process and is not actually executing any process. A value of the bits in field CPST equal to 011 indicates that the processor associated with table CPSTT is actually performing a process.

The remaining bit fields in table CPSTT, i.e., bit 0 and bits 4–15, inclusive, are not concerned with the present invention and therefore need not be described.

Figure 5:
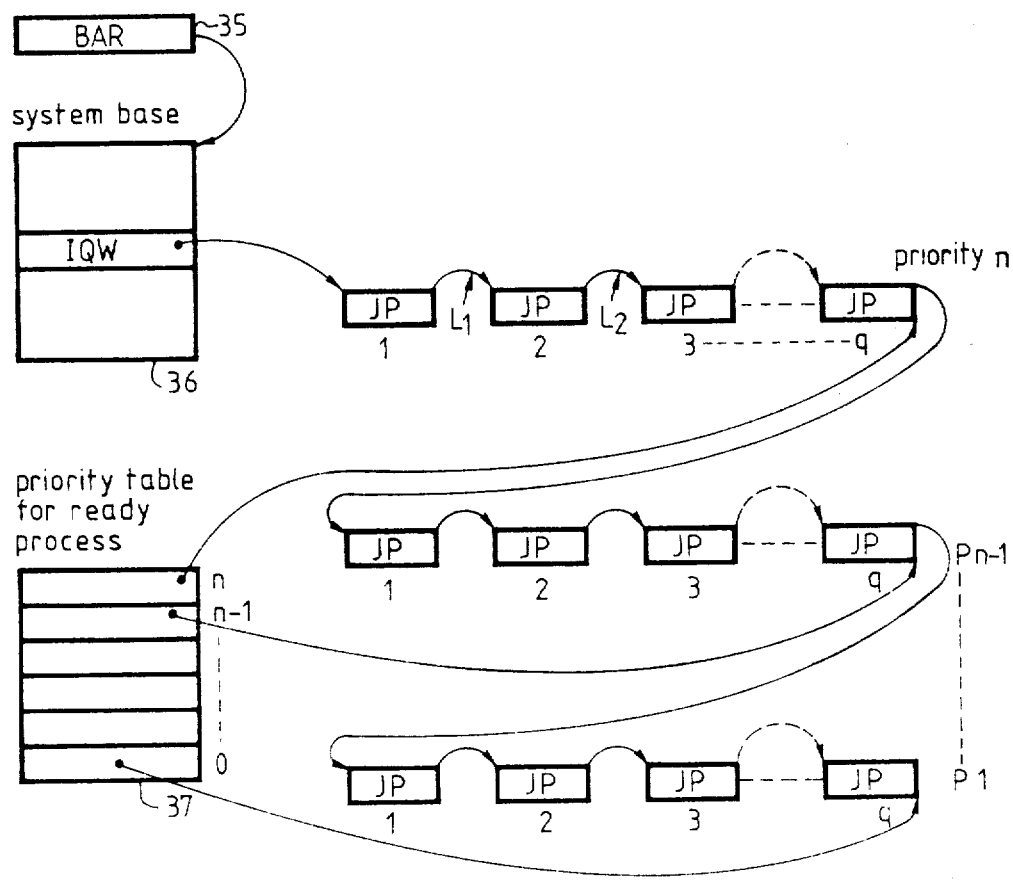
FIG. 5 is a schematic diagram of the central memory organization of a waiting queue for processes ready for execution.

Main memory unit 1 is organized in a manner illustrated in FIG. 5 to link together the processes which are ready for execution. FIG. 5 is a schematic diagram indicating the manner in which different registers or addresses within main memory unit 1 are linked together. The memory illustrated in FIG. 5 includes a multiplicity of storage areas JP in which are stored many signals, as illustrated by the chart of FIG. 6, indicative of the number of processes awaiting execution by the system illustrated in FIG. 1. The processes awaiting execution are stored on a priority basis and are distributed in areas JP in such a basis. Different priority levels are established with waiting queues being established in each priority level. In the system of FIG. 5, n priority levels $P_1 \ldots P_{n-1}, P_n$ are established. Each of the n priority levels includes a waiting queue for Q different processes. Thus, a total of Q.n storage areas are provided in main memory unit 1 to establish the order in which different processes are to be handled by the system. Within each priority level $P_k$, the area JP for each process is coupled to an adjacent area by a link, whereby the processes are coupled together by links which enable a particular process to recognize the following process which is coupled to it. Thus, priority level n includes areas JP 1, JP 2, JP 3 ... JP q, wherein area JP 1 is coupled to area JP 2 by link $L_1$, area JP 2 is coupled to area JP 3 by link $L_2$, etcetera. The last area in each priority level is coupled by a suitable link to the first area in the next lowest priority level, whereby, for example, area JP q of priority level n is coupled to area JP 1 of priority level $P_{(n-1)}$ by the illustrated link.

The process at the head of a waiting queue of the highest priority level is indicated by a pointer coupled to register IQW in system base 36 of main memory unit 1 from multi-bit output 2 of register 22, FIG. 3b, by way of data bus D. The contents of register 22 are coupled to pointer register IQW of system base 36 in response to a microprogram signal derived by control member 15 on output lead $Q_7$ thereof. Register IQW in system base 36 is accessed, in a conventional manner, by basic address register BAR 35, a part of a fixed zone of main memory unit 1.

To facilitate the management of the waiting queues illustrated in FIG. 5, main memory unit 1 includes priority table 37. Priority table 37 includes n registers, one for each of the priority levels, i.e., one for each of the n waiting queues. In each of the priority table registers is stored the address of the last process of each waiting queue of the associated priority level. Thus, in register n of table 37, the address in area JP q of priority level n is stored; in register (n−1) of table 37 is stored the address of the process in area JP q of priority level $P_{(n-1)}$ . . .; in register 1 of priority table 37 is stored the address of the process indicated by the value stored in area JP q of priority level 1.

Waiting queue management is a well known programming problem. Preferably it is solved in the present invention in the manner described in the previously mentioned patents.

FIG. 6 is a schematic diagram of the format of each of the storage areas in the memory system of FIG. 5. In particular, FIG. 6 is a diagram of the manner in which data are assembled in one area JP of one of the various priority levels to enable links $L_1$, $L_2$, etcetera, to be established. As such, FIG. 6 is a schematic diagram of a portion of main memory unit 1 in which is stored information enabling the waiting queues of FIG. 5 to be established and for data to be coupled from storage area to storage area.

The process link included within each of storage areas JP of FIG. 5 includes sixty-four bits arranged in a plurality of fields. A sixteen bit field NL from bits 0 to 15, inclusive, defines the address of the process link following the waiting queue. A one bit field R, at bit position 16, has a binary value of one when the process associated with the particular address JP leaves the queue for execution. A one bit field D, at bit position 17, is employed for synchronization, as is a one bit field SU at bit position 18. When the binary value of bit field SU is equal to one, the process associated with the link of FIG. 6 is indicated as being in a suspended state, whereby the process cannot be used by any of processors 4, 6 or 8. Bit field PRI, containing four bits in bit positions 24–27 loaded into or out of the priority register 2 of the allocated processor, indicates the process priority. Sixteen bit field JP, at bit positions 32–47, represents the number of the process corresponding to the link, as stored in the particular JP storage area. A sixteen bit field CPMK, at bit positions 48–63, represents a processor mask, wherein each processor of a system is provided with a separate bit within field CPMK. Thus, the sixteen bits in field CPMK enable a system to have a maximum of sixteen processors. For example, a mask for processor 1 is provided at bit position 48, a mask for processor 2 is provided at bit position 49, a mask for processor 16 is provided at bit position 63. A binary zero value at any bit position in mask CPMK indicates that the particular processor can start the process associated with the process link illustrated in FIG. 6 and stored in a particular area JP, FIG. 5. A binary one value for a particular bit position in mask CPMK indicates that the particular processor associated with that bit position cannot start the process. Mask field CPMK is formed from the decor to which the process associated with the link of FIG. 6 is a part. The bits of mask field CPMK are also arranged as a function of the status of the various processors, as indicated by field CPST of processor table CPSTT, FIG. 4. Mask CPMK is also determined by the status of mask field PRSM found in each process control block, as illustrated in FIG. 2. Mask CPMK is calculated when the start process instruction for starting of a process is executed and when a process is extracted from a waiting queue in response to a semaphore.

The operation of the dispatcher apparatus described in connection with FIGS. 1 and 3a, 3b and 3c, in combination with the formats described in connection with FIGS. 2, 4 and 6, and the memory organization of FIG. 5 is best understood with the aid of the flow diagrams of FIGS. 7a, 7b, 8a, 8b and 8c.

Figure 7A:
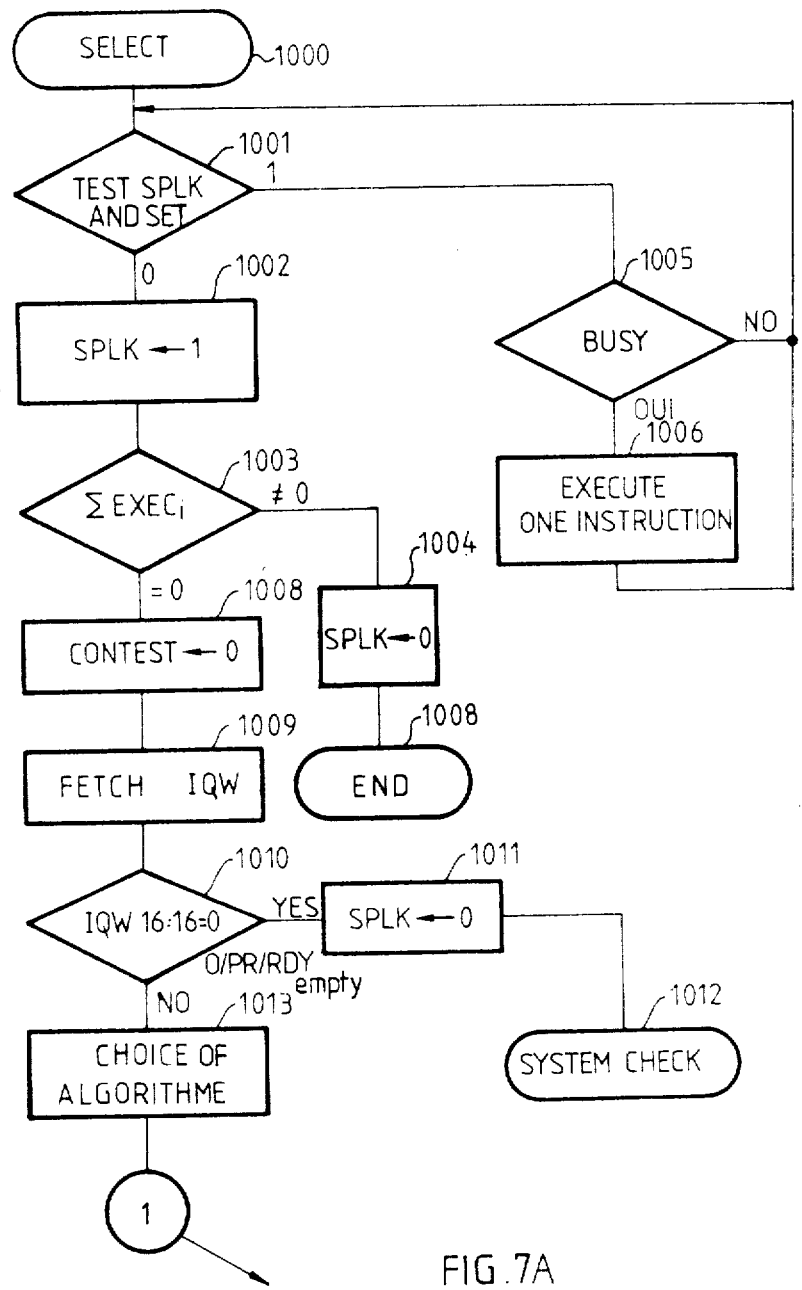
FIGS. 7a and 7b, together, are a flow diagram for a microprogram to execute the select operation.
Figure 7B:
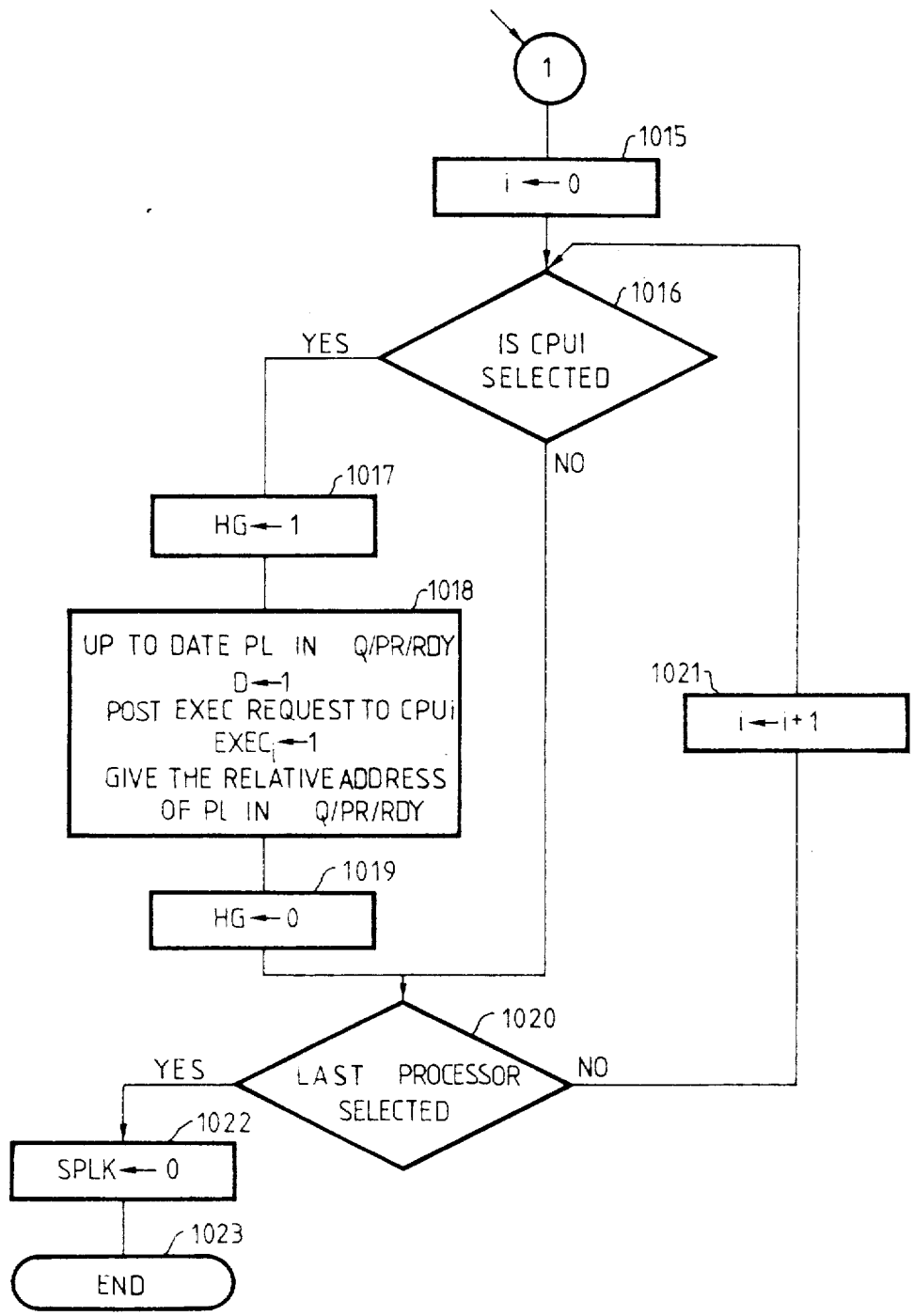

FIGS. 7a and 7b, together, are a flow diagram for the operation of the microprogram which is put into operation to execute the select function which allocates processors 4, 6 and 8 to processes which are desiring access to the processors, i.e., to applicant processes. The select microprogram is stored in the memory of control member OC 15, FIG. 3a, in each of processors 4, 6 and 8. Details of the microprogramming of control member 15 are supplied in the previously mentioned book by Husson. The select microprogram is performed on and in connection with the hardware devices described supra in connection with FIGS. 3a, 3b and 3c.

The select microprogram involves selecting the processes which should be executed from amongst all the waiting processes, i.e., the processes which are in the queue as illustrated in FIG. 5. The select operation is performed by the processor which modifies the processing status of the data processing system illustrated in FIG. 1. The select operation can be performed, for example, if a process is waiting for a message on a semaphore and the process being executed in a particular processor $P_n$ derives the message which is waiting on a semaphore. In such case, processor $P_n$ undertakes execution of the select function.

The fact that a modification in the process status of a particular processor is being performed is indicated by activating contest flip-flop 32 of the particular process to a set state by the processor making the modification. To this end, the processor making the modification supplies a control signal to instruction register 14 of the processor being modified via data bus D. Control member 15 of the processor being modified responds to the signal in register 14 to cause signal $C_{14J}$ of the control member to have a binary one value. The binary one value of signal $C_{14J}$ causes contest flip-flop 32 to be activated to the set state. The binary one state of flip-flop 32 is coupled through AND gate 33 in response to signal $C_{15}$, derived by control member 15 of the processor shortly after the derivation of signal $C_{14J}$, whereby a binary one signal is supplied by flip-flop 32 to input terminal 1 of AND gate 33. Shortly after flip-flop 32 has been activated to the binary one state, control member 15 causes signal $C_{15}$ to have a binary one value which is coupled to input terminal 2 of AND gate 33. Thereby, the set or binary one status of flip-flop 32 is coupled to output terminal 3 of AND gate 33 and thence is coupled as an input to microprogram control member 15. The binary one output of AND gate 33 causes control member 15 to execute the select microprogram associated with the flow diagram of FIG. 7a.

Control member 15 includes a pre-wired memory responsive to the binary one output of AND gate 33, to execute the instructions of FIG. 7a and perform the various branches of the program, dependent upon the status of other elements within the processor. The first operation of stage 1001 of the select microprogram involves testing the status of system lock flip-flop 27. To this end, the first signal derived by control member 15 involves supplying a binary one signal to lead $Q_{10}$, whereby signal $C_{10}$ has a binary one value and AND gate 28 is enabled to read the status of flip-flop 27. In response to flip-flop 27 being in a set state, whereby AND gate 28 derives a binary one value in response to a binary one value for signal $C_{10}$, the status of busy register 19 is tested. The status of busy register 19 indicates whether there is a process to be allocated to the processor. To this end, control member 15 causes signal $C_5$ to have a binary one value, whereby the contents of busy register 19 are supplied to decoder 20. If busy register 19 indicates that the process to be allocated is in the processor, decoder 20 derives a binary one signal which is applied to control member 15, to cause the processor to execute the following instruction of the process, during stage 1006. After the instruction associated with stage 1006 has been executed, control member 15 again checks the status of system lock flip-flop 27. If busy register 19 is not in a busy state and it is not necessary to execute an instruction, the microprogram returns immediately to stage 1001, involving testing of the state of system lock flip-flop 27.

In response to flip-flop 27 being in the reset state, whereby during operation 1001 a binary zero signal is derived from AND gate 28 in response to a binary one value of signal $C_{10}$, control member 15 is activated so that a binary one level is applied to lead $Q_{11J}$, whereby signal $C_{11}$ assumes a binary one value and flip-flop 27 is activated to a set or one state. Activation of flip-flop 27 to the set state prevents access to the semaphores and tables of main memory unit 1 by any processors of the system other than the processor which includes the flip-flop 27 which has been activated to the set state. After flip-flop 27 has been activated to the set state, control member 15 supplies a binary one level to lead $Q_{12}$, whereby signal $C_{12}$ assumes a binary one level, which enables the contents of counter 29 to be read out from the counter output 2 to input 1 of OR gate 30. While OR gate 30 is responsive to the count of counter 29, control member 15 supplies a high voltage to lead $Q_{13}$ whereby signal $C_{13}$ assumes a binary one value to enable AND gate 31. Thereby, in response to a count other than zero being in counter 29 while signal $C_{13}$ has a binary one value, a binary one value is derived from AND gate 31; if a count of zero is in counter 29 while signal $C_{13}$ has a binary one value, AND gate 31 derives a binary zero value. The binary one output of AND gate 31 is coupled via test bus T to control member 15, to activate the control member so that a binary one signal is derived on output lead $Q_{11K}$, whereby a binary one signal is applied to the K input of flip-flop 27, causing flip-flop 27 to be reset, as indicated by stages 1003 and 1004 in the flow diagram of FIG. 7a. Resetting of flip-flop 27 prevents further execution of the select function and causes the select microprogram to terminate. Hence, the select function can only be executed by the apparatus of the present invention if all of the applicant processes for execution in a preceding phase have been allocated.

If, however, counter 29 has a count of zero in it when tested by the binary one values for signals $C_{12}$ and $C_{13}$, i.e., during operation 1003, control member 15 is advanced so that a binary one signal is supplied to lead $Q_{14K}$, whereby a binary one signal is applied to the K input of flip-flop 32 to reset flip-flop 32, as indicated by operation 1008.

After flip-flop 32 has been activated to the reset state, control member 15 executes a microprogram wherein the IQW pointer in system base 36 which corresponds with the pointer in register 22 is located; operation 1009. To this end, control member 15 supplies a high voltage to lead $Q_7$, whereby signal $C_7$ has a binary one value and the contents of register 22 are supplied from output 2 of the register to data bus D. The signal on data bus D is supplied to memory control unit 2 and is compared in sequence with each of the values in system base 36, FIG. 5, until the signal on the data bus has the same value as the signal in one of the registers of system base 36. When the register in system base 36 having a signal corresponding with the signal in register 22 of the processor has been located, bits 16–31 of the status table, FIG. 4, in the main memory unit corresponding with the processor are tested in response to control member 15 deriving a binary one signal on one of the output leads Q thereof. It is to be recalled that bits 16–31 of the processor status table are reserved for the address of segment GO for the particular processor in the main memory unit. If no address is stored in bit positions 16–31 of status table CPSTT, memory control unit 2 supplies a signal to control member 15, to cause the control member to derive a binary one signal on output lead $Q_{11K}$, whereby a binary one signal is applied to the K input of flip-flop 27 and flip-flop 27 is activated to the reset state, as indicated by operation 1011. Activating flip-flop 27 to the reset state prevents further execution of the select function and causes the program to advance to a system check microprogram, as indicated by operation 1012. Checking the status of the contents of bits 16–31 of the word in the selected register of system base 36 involves feeding these bits to register 22 via data bus D under the control of signal $C_7$, as derived from control member 15. In response to all of the bits in register 22 having a binary zero value at this time, NOR gate 23 derives a binary one signal which is coupled to control member 15 by way of test bus T. Control member 15 responds to the binary one output of NOR gate 23 to supply a binary one signal to input K of flip-flop 27.

If bits 16–31 in the selected register of system base 36 coupled to register 22 do not all have a binary zero value, whereby the address of segment GO in memory is indicated by these bits, NOR gate 23 derives a binary zero signal in response to signal $C_7$ having a binary one value. The binary zero output of NOR gate 23 enables control member 15 to allocate the processors to the applicant process, as indicated by operation 1013. Different or variable algorithms can be used to define the allocation function. The algorithm depends upon the importance of the processor in the system. However, a programmer can easily select the algorithm best adapted to the particular processor by utilizing the following rules:

(a) selection of the processes must be carried out by considering the priority of the processes, as defined by the priority order in the waiting queue for processes ready for execution, as indicated in FIG. 5;

(b) the processes presently being executed, as indicated by a binary one value in bit position 16 (R), FIG. 6, cannot be selected; a binary one value in bit position 18 (SU), FIG. 6, indicates that the process has been completed and is in a waiting queue, ready for execution;

(c) if bits 15 and 18, FIG. 6, indicate that a process is not being executed, a processor to execute the process is selected from amongst the processors which can carry out the process, as can be determined from the bit values in processor mask CPMK, at bit positions 48–63, FIG. 6;

(d) the algorithm must enable the choice of processors to execute the process to be made from amongst the processors in the busy and vacant states; in the case of processors in the busy state, the selected processor will be the processor that is executing a lower priority process than the priority of the applicant process;

(e) when a process can be attributed, i.e., is to be executed, by more than one processor, the choice of processors must be directed to the processor which has already executed the process; to this end, the state of bit RHU in the process link, FIG. 6, is consulted.

The results of the processor allocation are transmitted to the working registers 26 bis of the selected processor, to associate the number of the selected processor to the number JP, FIG. 5, of the process which the processor should execute.

After the allocation operation, as indicated by the flow diagram of FIG. 7a, has been completed, the select microprogram updates the waiting queues of FIG. 5 according to the flow diagram of FIG. 7b. Operations 1015 and 1016, involving selecting the lowest number processor and verifying whether the selected processor or processors can perform the requesting process are performed in accordance with the previously described flow diagram of FIG. 7a. In response to operation 1016 indicating that the selected processor can perform the requesting process, control member 15 is activated so that output lead $Q_{16J}$ has a binary one level applied thereto, whereby signal $C_{16J}$ has a binary one value which is applied to the J input of flip-flop 27 bis, to set flip-flop 27 bis into the set state. The set state of flip-flop 27 bis is coupled from the Q output of the flip-flop to control member 15 which executes the microprogram that updates the process links in the waiting queues of FIG. 5 for the selected processor and increments the count of counter 29 by a count of one each time a processor is selected and requests execution of operation EXEC, FIGS. 8a, 8b and 8c for the selected processor. These steps which are performed when the queue of the process is ready for execution (Q/PR/RDY) are indicated as operation 1018 on FIG. 7b. After operation 1018 has been completed, control member 15 supplies a binary one signal to lead $Q_{16K}$, causing flip-flop 27 bis to return to a reset state. Resetting of flip-flop 27 bis activates control member 15 into a state which interrogates main memory unit 1 to determine if the last processor which is carrying out the accessing process has been selected; operation 1020. Operation 1020 is reached directly after operation 1016 if operation 1016 determines that the selected processor cannot perform the accessing process. In response to main memory unit 1 and memory control unit 2 indicating that the last processor has not been selected, during operation 1020, the memory control unit increments a register which commands interrogation of the next numbered processor, operation 1021. The verification selection operation 1016 is then performed on the next numbered processor to determine if that processor can perform the requesting process. If operation 1020 indicates that the last processor necessary to perform the requesting has been selected, memory control unit 2 supplies a signal via bus C to input K of flip-flop 27 in the last selected processor, causing resetting of that flip-flop. With flip-flop 27 activated to the reset state, the processor is no longer locked to protect semaphores, process waiting queues, waiting on semaphores, prospective processes to be executed, waiting queues for processes awaiting execution to enable updating of the status of system processors.

Figure 8A:
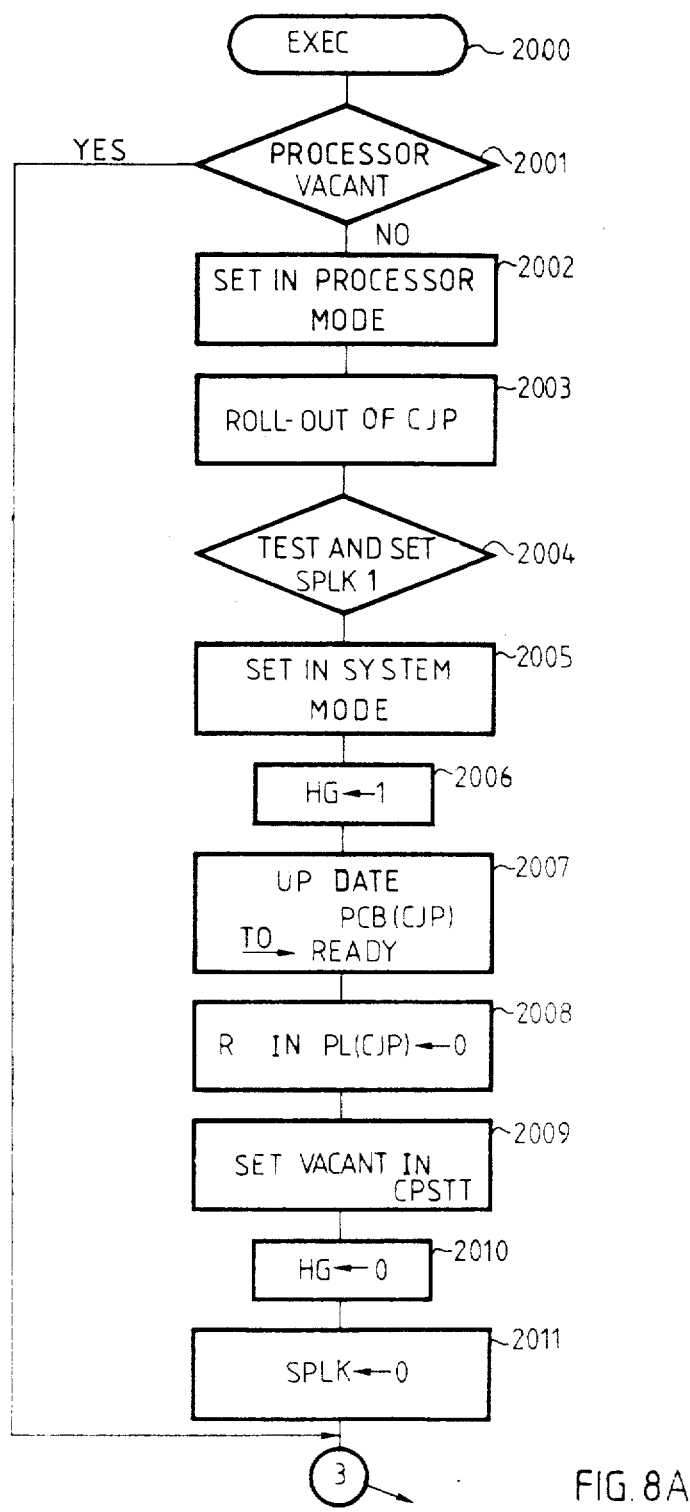
FIGS. 8a, 8b and 8c are a flow diagram for the execute microprogram.
Figure 8B:
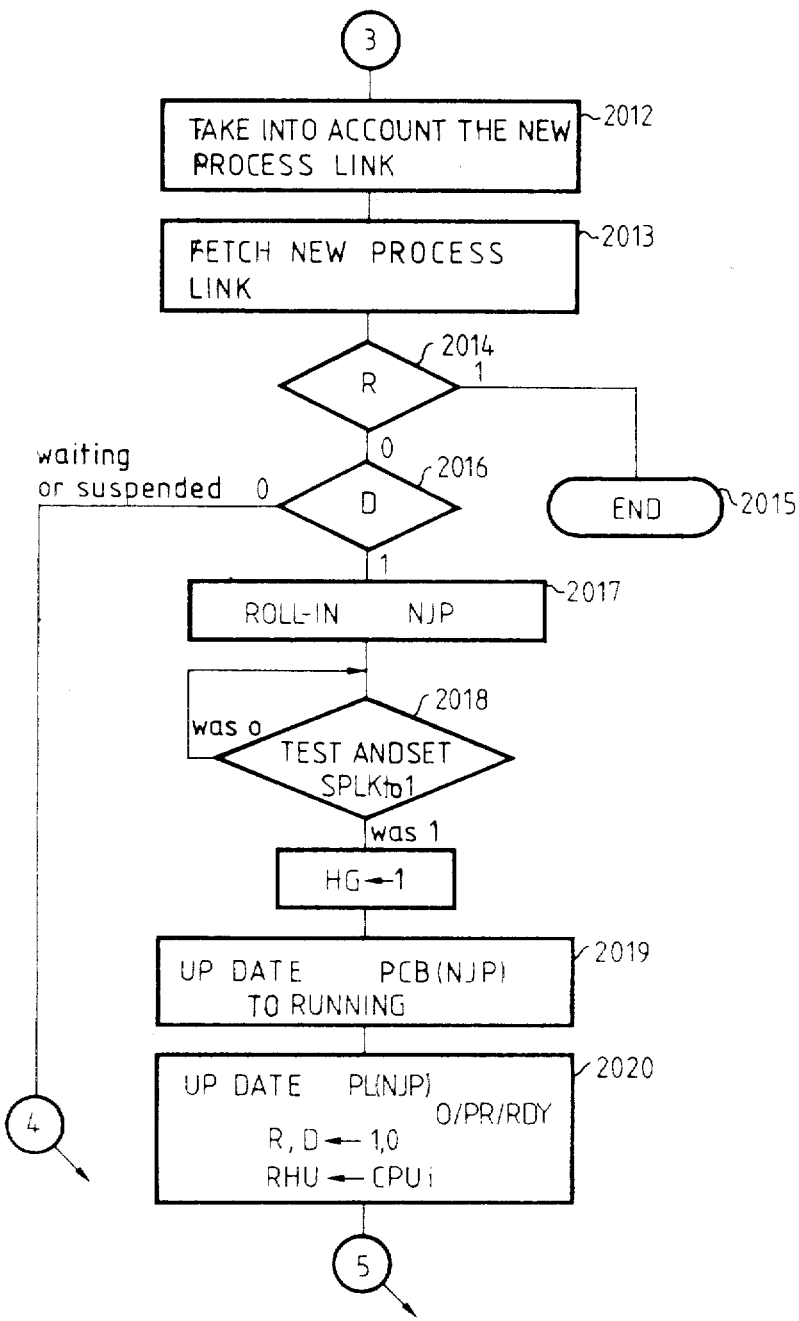
Figure 8C:
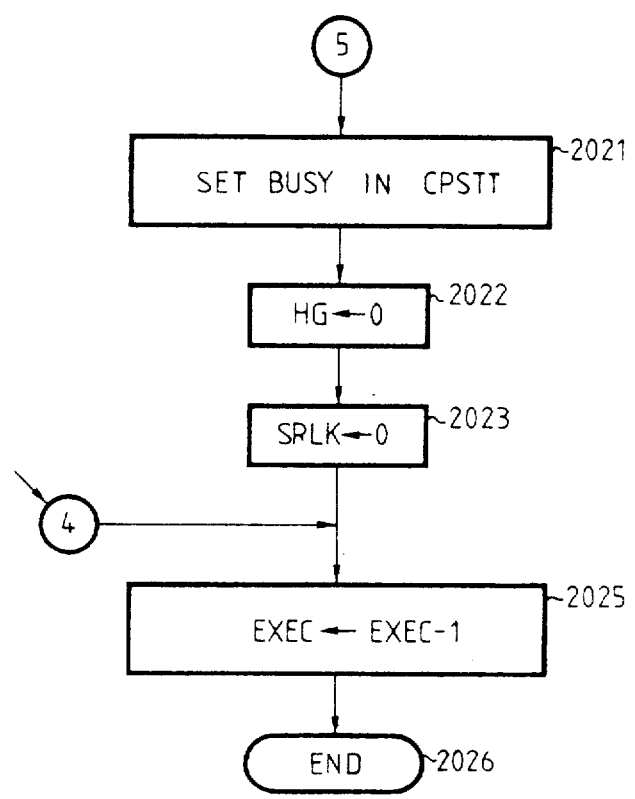

Reference is now made to FIGS. 8a, 8b and 8c, the flow diagram for the microprogram which is executed on each of the selected processors, i.e., operation 1018, FIG. 7b.

The first operation 2001 after the microprogram of FIG. 8a has been entered involves determining whether a particular processor is busy or vacant. To this end, control member 15 supplies a signal to lead $C_5$, whereby $C_5$ has a binary one signal to enable the contents of busy register 19 to be supplied to decoder 20. If the particular processor is not vacant, a fact recognized by decoder 20, the processor is executing a process which the processor must stop executing and such a processor must be put into the waiting queue of FIG. 5 and undertake the new process which has been allocated to it, as indicated by operation 2002. The first step in a processor terminating the process which it is presently executing involves executing a roll out sequence, operation 2003. The roll out sequence involves emptying all of the registers of the processor and updating process control block PCB, FIG. 2, with the data in the processor registers. To this end, control member 15 supplies control signals to memory control unit 2 and to each of registers 14, 16, 18, 19, 21, 22, 24, 26 and 26 bis sequentially, to load the contents of these registers sequentially into the portion of main memory unit 1 reserved for the process control block of the interrupted processor. Thereby, the contents of these registers are loaded into the register safeguard region of the process control block in main memory unit 1, which block is associated with the interrupted processor. After roll out operation 2003 has been completed, flip-flop 27 of the interrupted processor is activated to the set state by supplying a binary one signal from control member 15 of the interrupted processor to the J input of flip-flop 27 of the interrupted processor. In response to flip-flop 27 of the interrupted processor being acticated to the set state, the remaining processors in the system are prevented from having access to the semaphores of queues waiting on semaphores and to the process control blocks of main memory unit 1, as indicated by operation 2005.

Upon completion of operation 2005, control member 15 of the interrupted processor causes a binary one signal to be supplied to the J input of flip-flop 27 bis, whereby flip-flop 27 bis is activated to the set state. Activation of flip-flop 27 bis to the set state warns a diagnostic system (not shown) of a conventional nature of errors which one of the updating operations for the critical tables in main memory unit 1 have been performed. To this end, control member 15 supplies a binary one signal to the J input of flip-flop 27 bis. The set state of flip-flop 27 bis is coupled via bus T as an enable signal to the diagnostic system which analyzes the tables in main memory unit 1 associated with the process control block associated with the interrupted processor, as indicated in FIG. 2, and the process link stored in the main memory unit associated with the interrupted processor, as illustrated in FIG. 6. The binary one output indicating the set state of flip-flop 27 bis is also coupled to control member 15, to activate the control member to operation 2007.

During operation 2007, the process link corresponding to the interrupted process in the waiting queue of the processes ready for execution is updated. Updating of the waiting queue of the processes ready for execution of the process link corresponding to the interrupted process involves loading a binary zero into bit position 16 of the process link format in main memory unit 1, i.e., field R in FIG. 6 is loaded with a binary zero. After operation 2008 has been completed, control member 15 is activated so that it performs operation 2009, which involves updating of field CPST of processor table CPSTT, FIG. 4, for the interrupted processor. Field CPST is updated to indicate that the processor is in a vacant status. Thus, the binary bits 010 are respectively loaded into bit positions 1, 2 and 3 of field CPST of table CPSTT in main memory unit 1 that is associated with the interrupted processor. Loading of these three bits into field CPST is performed under the control of member 15 in the interrupted processor in a manner well known to those skilled in the art.

After operation 2009 has been completed, flip-flop 27 bis is activated to the reset state, operation 2010. To this end, control member 15 causes a binary one signal to be applied to input terminal K of flip-flop 27 bis. Immediately after flip-flop 27 bis has been reset during operation 2010, control, member 15 supplies a signal to the K input of flip-flop 27, to reset flip-flop 27 as indicated by operation 2011. Upon completion of operation 2011, control member 15 advances so that it performs the operations in FIG. 8b.

Operations 2002–2011 are performed in response to operation 2001 indicating that a processor desired to be interrupted is vacant. If, however, 2001 indicates that the processor is not vacant, operations 2002–2011 are not executed and the microprogram advances immediately to the first operation in FIG. 8b.

Reference is now made to FIG. 8b of the drawing wherein there is illustrated a flow diagram of an additional portion of the operations performed of the interrupted processor and on elements within main memory unit 1 associated with the interrupted processor. During operation 2012 a search is made in main memory unit 1 for the link of the process corresponding to the process selected to be executed. To this end, bits 0–15, FIG. 6, of the different process links, as stored in areas JP of main memory unit 1, are sequentially examined until the address of the process link is the same as the address for the link of the process corresponding to the process selected to be executed. After the sought link has been found, bits 0–15 of the sought process link are loaded into one of working registers 26 bis of the interrupted processor, during operation 2013. Operations 2012 and 2013 are performed in main memory unit 1 in response to control signals supplied by control member 15 of the interrupted processor under the control of signal $C_1$. Data and instructions are transferred between the interrupted processor and main memory unit 1 by way of data bus D. All of the data in the process link illustrated in FIG. 6 are transferred into working registers 26 bis.

After operation 2013 has been completed, the working register in the interrupted processor which stores data bit 16 in the process link is tested under the control of an output signal of control member 15 by way of a signal coupled to the working registers by control bus C and lead $C_9$ bis. The value of bit R is examined by supplying the contents of the register in working registers 26 bis which holds the value of bit R to arithmetic logic unit 17 which performs a comparison on the value of bit R to determine if bit R has a value of one. In response to arithmetic logic unit 17 determining that bit R has a value of one, a determination is made that the process corresponding to the link is being executed in the interrupted processor, whereby the execution operation of FIGS. 8a, 8b and 8c cannot continue. If, however, the value of bit R is a binary zero, a test is performed on bit D of the process link. The test is performed by supplying the register in working registers 26 bis which stores the seventeenth bit of the process link to arithmetic logic unit 17, as described supra in connection with the sixteenth bit of the process link. If operation 2016, which involves determining the value of bit D, indicates that bit D has a binary value of one, the parameters necessary for starting the new selected process are loaded into working registers 26 bis of the interrupted processor during stage 2017. This operation is performed by supplying all of the program or instruction signals and data in main memory unit 1 for the new selected process into working registers 26 bis of the interrupted processor.

Upon completion of operation 2017, the program advances to operation 2018, during which the status of flip-flop 27 is determined. To this end, control member 15 supplies a binary one signal to lead $Q_{10}$, whereby signal $C_{10}$ has a binary one value to enable AND gate 28. If AND gate 28 derives a binary zero signal at this time, to indicate that flip-flop 27 is in a reset state, flip-flop 27 bis is activated to the set state. Activating flip-flop 27 bis to the set state causes the status word of the process control block, FIG. 2, corresponding to the process which has just been initiated, to be supplied with a signal indicating that the process which has just been initiated is in an execution state. Such an operation is performed by controller 15 in the processor including the flip-flop 27 bis that is activated to the set state supplying signal $C_9$ to selector 25, which in turn enables a register in bank 26. The enabled register in bank 26 supplies a signal indicative of the status word to the status word segment (STWA) of the process control block in main memory unit 1 by way of data bus D. In addition, setting flip-flop 27 bis to the binary one state causes the corresponding link in the waiting queue of FIG. 5 to be updated by loading a binary one and a binary zero into bit positions 16 and 17 of the waiting link, i.e., R=1 and D=0 in the process link associated with the just initiated process; operation 2019. If, however, the result of testing the status of flip-flop 27 indicates that flip-flop 27 is activated to the reset state, a binary zero is derived from AND gate 28, causing control member 15 to supply a binary one signal to the J input of flip-flop 27 to set flip-flop 27 to the binary one state. During operation 2020, the number of the processor on which the process is initiated is written into zone RHU of main memory unit 1.

After operation 2020 has been completed, control member 15 supplies a control signal to main memory unit 1 to update table CPSTT, FIG. 4, associated with the interrupted processor. Table CPSTT of the interrupted processor is updated by loading the busy indicator into memory field CPST of table CPSTT, whereby bits 1, 2 and 3 of field CPST are respectively set to the values 011, operation 2021.

Upon completion of operation 2021, control member 15 is activated so that flip-flops 27 bis and 27 are returned to the reset state during stages 2022 and 2023, respectively. To this end, control member 15 supplies input terminals K of flip-flops 27 bis and 27 with binary one signals.

The execute operation associated with the interrupted processor is terminated immediately after operation 2023 or after operation 2016 indicates that D=0, i.e., bit position 17 equals zero in the process link of FIG. 6. In response to either of these occurrences, control member 15 supplies a decrement signal to counter 29, to reduce the count stored in counter 29 by a count of one, as indicated by operation 2025. Upon completion of operation 2025, the execution microprogram for the interrupted processor is completed and the microprogram is terminated, as indicated by operation 2026.

While there has been described and illustrated one specific embodiment of the invention, it will be clear that variations in the details of the embodiment specifically illustrated and described may be made without departing from the true spirit and scope of the invention as defined in the appended claims.

We claim:

1. A data processing system comprising plural individual data processors, a main memory for storing processes to be executed by the data processors, a process control block being stored in the main memory for each process, the process control block including: for each process (a) a priority level, (b) a status indicator, (c) a start address in the main memory, and (d) the value of a process instruction count indicative of an execution point in the process where the process was previously interrupted, the main memory including for each processor (a) a status indicator and (b) address field, the main memory including plural areas for storing the processes in waiting queues, the storing areas being arranged in priority levels. the storing areas in like priority levels being linked together. each storing area having data assembled in a format to indicate (a) an address of a following process link in the waiting queue, (b) the priority of the process, (c) the number of the process corresponding to the process link, and (d) a mask for each processor, means responsive to (1) the status indicators for the processors, (2) the address field, (3) masks for the processor and (4) the priority levels of processes in the main memory for calculating an allocation of the processes to the processors, means responsive to the calculated allocation for selectively interrupting a process being executed by a first processor, the first processor being the processor selected by the means for calculating, means responsive to the first processor being interrupted for transferring all signals for the process being executed by the first processor from the first processor to the main memory so that the main memory stores (1) interrupted process, (2) the interrupted process status indicator, and (3) the instruction count of the interrupted process in the first processor, and means for transferring signals for the interrupting process from the main memory to the first processor so that the first processor begins executing the interrupting process at the instruction of the interrupting process indicated by the value of the instruction count of the interrupting process when the interrupting process was previously interrupted.

2. A data processing system for executing several processes comprising several individual processors susceptible of having different states, a memory, means including transmission channel for selectively connecting each processor to the memory, the memory storing an execution allocation of the processes to the processors, the allocation of the processes to the processor being susceptible to changes in state, means coupled to the memory for controlling the allocation of the plural processes susceptible for execution by said processors, means included in each processor and coupled via the channels to the means for controlling the allocation and to the other processors for selecting particular processors of the system to perform said allocation of the plural processes susceptible for execution by said processors, said selecting means of each processor including: first signal deriving means, said first signal deriving means being coupled via the channels to the means for controlling the allocation and responding to a change in allocation state of the processes of the system awaiting execution and for storing an indication of the change of allocation state, said first signal deriving means also being coupled to the processors via the channels and being responsive to a change in operating state of the processors to authorize the processor which changed operating state to execute the allocation of the plural processes susceptible for execution by several processors to the processors of the system, a second signal deriving means coupled via the channels to be responsive to the system processors for storing an indication that said allocation is already being performed by any processor, the first signal deriving means being connected to be responsive to the indication stored by the second signal deriving means for preventing execution of the allocation of the plural processes susceptible for execution by said processors to the processors of the system.

3. The system of claim 2 wherein the second signal deriving means comprises a counter having a count to indicate the number of allocation operations of the processes to the processors which have not been completed.

4. The system of claim 3 wherein the second signal deriving means comprises a bistable locking means for locking the system when a processor is selected.

5. The system of claim 4 wherein said main memory includes zones containing queueing lines of the plural processes susceptible to execution by the several processors, said locking means includes means for blocking access to the zones of the main memory containing the queueing lines in response to a modification in the allocation state of the processes, the access being blocked in such a manner that access to said zone is reserved only for the processor performing a distribution of the processes between all of the system processors.

6. The system of claim 5 wherein the first signal deriving means also comprises means for indicating process interlinkages of the queueing lines each time a process is allocated to a processor of the system.

7. The system of claim 6 wherein each processor includes registers to which each process susceptible to implementation is assigned, further comprising means coupled to the processors for emptying the state of the registers of each processor to which a process susceptible to implementation is assigned has been allocated in response to the processor to which the candidate process has been allocated implementing another process, means for loading the registers of the processors, said means for emptying being coupled with the means for loading the registers of the selected processor with parameters required for implementation of the process which is allocated to it.

8. The system of claim 2 wherein the second signal deriving means comprises a bistable locking means for locking the system when a processor is selected.

9. The system of claim 8 wherein said main memory includes zones containing queueing lines of the plural processes susceptible to execution by the several processors, said locking means includes means for blocking access to the zones of the main memory containing the queueing lines in response to a modification in the allocation state of the processes, the access being blocked in such a manner that access to said zones is reserved only for the processor performing a distribution of the processes between all of the system processors.

10. The system of claim 2 wherein the main memory stores queueing lines of the processes susceptible to execution by the system, the queueing lines for the processes being interlinked with each other on a priority basis, the first signal deriving means also comprising means for signalling an order in which the processes of the queueing lines are interlinked each time a process is allocated to a processor of the system.

11. The system of claim 2 wherein each processor includes registers to which each process susceptible to implementation is assigned, further comprising means coupled to the processors for emptying the state of the registers of each processor to which a process susceptible to implementation is assigned has been allocated in response to the processor to which the candidate process has been allocated implementing another process, means for loading the registers of the processors, said means for emptying being coupled with the means for loading the registers of the selected processor with parameters required for implementation of the process which is allocated to it.

* * * * *